US012320065B2

(12) United States Patent
Schnider et al.

(10) Patent No.: US 12,320,065 B2
(45) Date of Patent: Jun. 3, 2025

(54) METHOD FOR PRODUCING DENSIFIED CELLULOSIC COMPOSITE MATERIAL

(71) Applicants: ETH ZURICH, Zürich (CH); EMPA, EIDGENÖSSISCHE MATERIALPRÜFUNGS- UND FORSCHUNGSANSTALT, Dübendorf (CH)

(72) Inventors: Thomas Schnider, Schüpfheim (CH); Ingo Burgert, Zürich (CH); Jana Segmehl, Zürich (CH); Tobias Keplinger, Uitikon Waldegg (CH)

( * ) Notice: Subject to any disclaimer, the term of this patent is extended or adjusted under 35 U.S.C. 154(b) by 718 days.

(21) Appl. No.: 16/608,835

(22) PCT Filed: Apr. 12, 2018

(86) PCT No.: PCT/EP2018/059366
§ 371 (c)(1),
(2) Date: Oct. 27, 2019

(87) PCT Pub. No.: WO2018/197222
PCT Pub. Date: Nov. 1, 2018

(65) Prior Publication Data

US 2020/0208346 A1 Jul. 2, 2020

(30) Foreign Application Priority Data

Apr. 26, 2017 (EP) .................................... 17168238

(51) Int. Cl.
*D21C 3/00* (2006.01)
*B27N 1/00* (2006.01)
(Continued)

(52) U.S. Cl.
CPC ............... *D21C 3/003* (2013.01); *B27N 1/00* (2013.01); *B27N 3/02* (2013.01); *B27N 5/00* (2013.01); *D21C 3/006* (2013.01); *D21J 3/00* (2013.01)

(58) Field of Classification Search
CPC .......... D21C 3/003; D21C 3/006; D21C 3/00; D21C 9/18; B27N 1/00; B27N 3/02; B27N 5/00; D21J 3/00
See application file for complete search history.

(56) References Cited

U.S. PATENT DOCUMENTS 4,113,555 A 9/1978 Nyren et al.
4,693,757 A 9/1987 Sabate
(Continued)

FOREIGN PATENT DOCUMENTS

CN 103821021 A * 5/2014
CN 108699420 10/2018
(Continued)

OTHER PUBLICATIONS

English translation of JP2001073300A retrieved from Espacenet.com on Aug. 10, 2022 (Year: 2022).*
(Continued)

*Primary Examiner* — Jacob T Minskey
*Assistant Examiner* — Elisa H Vera
(74) *Attorney, Agent, or Firm* — JMB Davis Ben-David

(57) ABSTRACT

The present invention provides a method for obtaining densified material comprising the steps of
a. providing lignocellulosic material,
b. delignification of the lignocellulosic material providing a delignified material, wherein the delignification step is performed in such a way that the lignin of the lignocellulosic material is almost completely removed and wherein the structural integrity of the lignocellulosic material is maintained in the delignified material,
(Continued)

c. densification of the delignified material providing a densified material.

Furthermore, a densified material is provided. The fibers and fibrils are maintained in the structural directionality of the raw material and that the cellulosic material is whitish.

17 Claims, 5 Drawing Sheets

(51) Int. Cl.

| | |
|---|---|
| ***B27N 3/02*** | (2006.01) |
| ***B27N 5/00*** | (2006.01) |
| ***D21J 3/00*** | (2006.01) |

(56) References Cited

U.S. PATENT DOCUMENTS

| | | | | |
|---|---|---|---|---|
| 2005/0067123 | A1 | 3/2005 | Dezutter et al. | |
| 2007/0278463 | A1* | 12/2007 | Ratzsch et al. | C09K 21/14 252/607 |
| 2008/0206541 | A1* | 8/2008 | Medoff | C08L 97/02 428/292.1 |
| 2009/0142523 | A1* | 6/2009 | Nilsson | D21J 7/00 162/388 |
| 2012/0264178 | A1 | 10/2012 | Anderson et al. | |
| 2013/0206349 | A1* | 8/2013 | Nonni | D21C 9/007 162/158 |
| 2014/0203468 | A1* | 7/2014 | Humphries | B29C 70/025 264/71 |
| 2015/0051385 | A1* | 2/2015 | Binder | C07G 1/00 530/507 |
| 2015/0158031 | A1* | 6/2015 | Sloan | B03B 5/04 209/17 |
| 2016/0362845 | A1 | 12/2016 | Kuo et al. | |
| 2018/0370071 | A1* | 12/2018 | Boitouzet | C08B 1/003 |
| 2021/0122902 | A1* | 4/2021 | Hu | B32B 3/20 |

FOREIGN PATENT DOCUMENTS

| | | | |
|---|---|---|---|
| EP | 0595674 | 5/1994 | |
| JP | S55101404 | 8/1980 | |
| JP | S60-079952 | 5/1985 | |
| JP | 2001073300 A * | 3/2001 | B27N 3/007 |
| JP | 2004330141 | 11/2004 | |
| JP | 2006001270 | 1/2006 | |
| JP | 2015077740 | 4/2015 | |
| JP | 2015529582 | 10/2015 | |
| JP | 2018062167 | 4/2018 | |
| JP | 2019514032 | 5/2019 | |
| WO | 9935330 | 7/1999 | |
| WO | 02052101 | 7/2002 | |
| WO | 03047826 | 6/2003 | |
| WO | 2006125517 | 11/2006 | |
| WO | 2014033352 | 3/2014 | |
| WO | 2016080895 | 5/2016 | |

OTHER PUBLICATIONS

English translation of CN103821021A retrieved from Espacenet (Year: 2024).*

Yano et al. “High Strength Wood-based Material”, Cellulose Commun., vol. 10, No. 1, 2003, p. 22-27.

Yano et al.“High-Strength Wood-based Materials”, J. Mat. Sci. Lett., 16 (1997) 1906±1909.

Shams et al., “Compressive deformation of wood impregnated with low molecular weight phenol formaldehyde (PF) resin III: effects of sodium chlorite treatment” J Wood Sci (2005) 51:234-238.

Yano et al., “Effects of the removal of matrix substances as a pretreatment in the production of high strength resin impregnated wood based materials,” Journal of Materials Science Letters 20, 2001, 1125-1126.

Yano et al., “Potential strength for resin-impregnated compressed wood,” Journal of Materials Science Letters 20, 2001, 1127-1129.

Frey et al., “Delignified and Densified Cellulose Bulk Materials with Excellent Tensile Properties for Sustainable Engineering,” ACS Appl. Mater. Interfaces 2018, 10, 5030-5037.

* cited by examiner

METHOD FOR PRODUCING DENSIFIED CELLULOSIC COMPOSITE MATERIAL

CROSS-REFERENCE TO RELATED APPLICATIONS

This is the U.S. National Stage of International Patent Application No. PCT/EP2018/059366 filed Apr. 12, 2018, which claims priority to European Patent Application No. 17168238.8 filed on Apr. 26, 2017.

FIELD OF THE INVENTION

The present invention relates to cellulosic delignified and/or densified material and the method for producing such composite material.

BACKGROUND OF THE INVENTION

Cellulosic composite materials which possess exceptional mechanical properties and can be modified for new functionalities are highly desired. One scientific and technological important invention in the field was the fabrication of nanocellulose. Nanofibrils and nanocrystals can more easily be functionalized and the individual elements have great mechanical properties. However, so far it is a great challenge to transfer the mechanical performance of the individual units to the bulk composite material, because it is a difficult task to re-orient the fibres and assemble them in a controlled fashion after the required disintegration of the wood structure.

Non-modified de-lignified cellulose fibers are also obtained in conventional pulp production processes. But in this process, the wood fibers are dispensed during the delignification and as mentioned above, the re-orientation of the cellulose fibers is a challenging task.

A mainly parallel orientation of cellulose fibers is given in untreated wood. The cell wall of the wood fibers consists of lignin, cellulose, and hemicelluloses. Cellulose fibers contribute to tensile strength, whereas lignin contributes to compressive strength and structural integrity.

To maintain the structural integrity, densification processes described in the prior art are characterized by only partial removal of lignin and replacement of lignin by resins. In Shams et al. (Shams et al., 2005, J Wood Sci 51:234-238) and Yano et al (Yano et al, 2001, J. Mater. Sci Letters 20: 1125-1126), resin-impregnated blocks of Japanese cedar and Hoop pine, respectively, were densified after partial removal of lignin to obtain composites characterized by a high density and a high resistance to bending forces.

The underlying problem to be solved by the present invention is the production of a delignified and densified (cellulosic) material of sufficient size with a parallel fiber orientation.

In contrast to the methods described in the prior art, the present invention relates to the production of an almost lignin-free, highly densified cellulosic composite material, produced in particular by a combination of compression and shear forces. The delignification is based on pulp production processes, but it allows for maintaining the structural directionality of the raw material, here wood. This is achieved by delignifying entire wooden blocks of treatable size, which are then strongly densified in a second step to gain a very compact and densified material with a controlled and parallel fibre orientation.

Terms and Definitions

In the context of the present invention, the term "lignocellulosic material" relates to a material that comprises lignin, hemicelluloses and cellulose, wherein the cellulose forms fibrils, which are arranged in a mainly parallel orientation. Typical examples for lignocellulosic material comprises material obtained from lignifying plants, in particular wood of deciduous trees or conifers. The deciduous trees or conifers may be non-modified or genetically modified.

In the context of the present invention, the term "delignification" relates to the removal of lignin from lignocellulosic material. Lignin is a branched polymer located between the cellulose microfibrils in the cell walls of lignified parts of a plant, in particular wood. The lignin polymer contains several functional groups as ether linkages, phenolic hydroxyl groups, aliphatic hydroxyl groups, unsubstituted or methyl-substituted C2, C3, C5 or C6 moieties, unsaturated moieties and ester groups that may react during delignification. For example, ethers may be cleaved by nucleophilic attacks, carbonyl and aldehyde groups react with nucleophiles, hydroxyl groups may be ionized or —O-methyl groups demethylated to allow a nucleophilic attack of the oxygen ion. Furthermore, conjugate addition, formaldehyde addition, epoxide addition and aldol condensation reactions might contribute to the depolymerisation of lignin. These chemical reactions result in the depolymerization of the lignin polymer into smaller moieties that diffuse from the lignocellulosic material into the surrounding solution and/or that are removed by several washing steps.

In the context of the present invention, the term "delignified material" relates to a material that is obtained by delignification of lignocellulosic material. The delignified material comprises cellulose, wherein the cellulose forms fibers that are arranged in a mainly parallel orientation.

In the context of the present invention, the term "densification" relates to the compression of delignified material. By applying a vertical pressure force in radial or tangential direction on delignified material, the volume of the spaces is reduced. A pressure is applied until a predefined thickness of the delignified material or the maximum compression is achieved. Furthermore an additional entanglement of the cellulosic fibres and fibrils may be obtained by applying lateral vibrations that cause a lateral shear force.

In the context of the present invention, the term "structural integrity" relates to the spatial arrangement of fibres in lignocellulosic material, delignified material and densified material in longitudinal direction. Fibres in wood are arranged in a mainly parallel orientation. This parallel alignment is maintained during delignification and densification.

In the context of the present invention, the term "densified material" relates to a material that is obtained by densification of delignified material. The densified material comprises cellulose, wherein the cellulose forms fibers that are arranged in a mainly parallel orientation. The density of densified material ranges from 400 to 1200 kg/m$^3$. Further entanglement of the cellulose fibers and microfibrils might be achieved by applying lateral vibrations during densification.

In the context of the present invention, the term "hardwood" relates to wood of deciduous trees. The deciduous trees may be non-modified or genetically modified. Non-limiting examples for deciduous trees are *Acer* spp., *Betula* spp., *Fagus sylvatica, Quercus* spp. *Fraxinus excelsior, Populus* spp., *Prunus avium, Tilia* spp., *Robinia pseudoacacia, Tectona grandis, Ulmus* spp., *Juglans regia, Carpinus betulus.*

In the context of the present invention, the term "softwood" relates to wood of conifers. The conifers may be non-modified or genetically modified. Non-limiting examples for conifers are *Pseudotsuga menziesii, Taxus baccata, Picea abies, Pinus sylvestris, Larix decidua, Thuja plicata, Abies alba, Pinus strobus.*

In the context of the present invention, the term "oxidizing agent" relates to agents that oxidize lignin. Such oxidizing treatments are achieved by treatments comprising enzymes such as laccase, fungi or chemical substances such as $Cl_2$ in water, HClO, peracetic acid (PAA), NaOH, $NaClO_2$, $Na_2S_2O_4$, $ClO_2$, $HAc/H_2O_2$ or $O_3$, ionic liquids or treatments which use catalysts, e.g. manganese salts.

In the context of the present invention, the term "radial direction" relates to a direction that is perpendicular to the longitudinal direction of the cellulose fibers and crosses the annual rings of a piece of wood.

In the context of the present invention, the term "tangential direction" relates to a direction that is perpendicular to the longitudinal direction of the cellulose fibers and aligns to a tangent of an annual ring of a piece of wood.

In the context of the present invention, the term "elastic modulus" relates to the slope of a stress-strain curve in the elastic deformation region and is a measure of the elastic deformation of the material. Stress is the force per cross section in a tensile test that can cause deformation of a material and strain is the elongation of the material related to its original length. The SI unit for the elastic modulus is pascal (Pa) or $N/m^2$, the practical unit is gigapascal (GPa). In the conduced tensile test, the loading direction was in the longitudinal direction, which means in the direction of the cellulosic fibers.

In the context of the present invention, the term "tensile strength" relates to the maximum tensile stress the cellulosic material can withstand. The loading direction was in the longitudinal direction, which means in the direction of the cellulosic fibers. The SI unit for tensile strength is pascal (Pa) or $N/m^2$, the practical unit is megapascal (MPa) or $N/mm^2$.

In the context of the present invention, the term "unit" relates to a cohesive piece of lignocellulosic, delignified or densified material of any shape comprising mainly parallel aligned cellulose fibres. The minimal volume can be in the $\mu m^3$ range. More easily treatable units in terms of the densification treatments are characterized by a volume in the $cm^3$ range. The maximum volume is defined by the size of the densification apparatus and the feasibility of the delignification since the delignification solution has to infiltrate the whole unit in order to achieve an almost complete removal of lignin. According to the Fick's laws of diffusion, the temporal change of concentration dc(x,t) (c, concentration; x, diffusion distance, t, time), the distance x is proportional to $t^{0.5}$.

DESCRIPTION OF THE INVENTION

According to a first aspect of the invention, a method for obtaining densified material is provided, comprising the steps of a. providing lignocellulosic material,
b. delignification of the lignocellulosic material providing a delignified material, wherein the delignification step is performed in such a way that the lignin of the lignocellulosic material is almost completely removed and wherein the structural integrity of the lignocellulosic material is maintained in the delignified material,
c. densification of the delignified material providing a densified material.

In certain embodiments, the delignification step is performed for a certain time or repeatedly until the characteristic color of the lignocellulosic material is lost.

Delignified material is obtained by an almost complete removal of lignin. The person skilled in the art knows that lignin contributes to the brown color of lignocellulosic material, i.e. the characteristic color of wood. In a fully delignified state the material consists mainly of cellulose fibers that are whitish. Alkaline treatment results in a darkening due to the disintegration of the lignin macromolecule and the formation of novel chromophoric centers, which requires further bleaching. Thus, depending on the thickness of the material, delignification/bleaching has to be performed until the delignified material appears white to colorless. Lignin constitutes approximately 20 to 35% of the dry mass of wood, for example the lignin content in conifers ranges from 27 to 32% and in deciduous trees (*Betula, Fagus*) from 19 to 23% (H. G. Hirschberg: *Handbuch Verfahrenstechnik and Anlagenbau*. Springer Verlag 1999: p. 436). Besides lignin, an additional partial removal of hemicellulose and amorphous cellulose occurs. Thus, the delignification may also be performed until the respective loss of weight is reached, in particular a loss of weight is reached, which corresponds at least to the amount of lignin of the starting material.

If the delignification is inhomogeneous the delignified material does not appear evenly whitish. Upon tensile loading without a prior addition of a resin, such material will crack or break in the brownish colored areas or at the interface to the whitish areas.

The structural integrity of delignified and/or densified material comprises the specific arrangement of fibres. The lignocellulosic material, for example in softwood, contains fibers (precisely tracheids, in a biological context) which are approximately 3 mm long and 30 μm in diameter. The cell walls of the fibers consist of cellulose microfibrils. A microfibril is formed by several cellulose chains and possesses a length of approximately 15 nm length and a diameter of approximately 3 nm. Lignin and hemicellulose fill spaces between the cellulose fibrils. The microfibrils in normal wood are predominately aligned in longitudinal direction (small microfibril angle). This mainly parallel alignment is maintained upon removal of lignin and during densification.

In certain embodiments, the delignification step causes a weight loss of 20% to 40% of the dry mass of the lignocellulosic material.

In certain embodiments, the delignification step causes a weight loss of 28 to 40% of the dry mass of the lignocellulosic material, wherein the lignocellulosic material is wood from a conifer.

In certain embodiments, the delignification step causes a weight loss of 20 to 32% of the dry mass of the lignocellulosic material, wherein the lignocellulosic material is wood from a deciduous tree.

In certain embodiments, the delignification step comprises treating the lignocellulosic material with at least one acid. The pH is adjusted between 1 and 6, in this case it is 1.

In certain embodiments, the delignification step comprises treating the lignocellulosic material at least with one inorganic or organic acid.

In certain embodiments, the delignification step comprises treating the lignocellulosic material with acetic acid, sulfuric acid, chloric acid or peracetic acid.

In certain embodiments, the delignification step comprises treating the lignocellulosic material with at least one oxidizing agent under alkaline or acidic conditions. Under alkaline conditions, the pH is adjusted between 8 and 14. Under acidic conditions, the pH is adjusted between 1 and 6.

In certain embodiments, the delignification step comprises treating the lignocellulosic material with hydrogen peroxide, sodium chlorite, sodium sulfite or ozone under alkaline or acidic conditions.

In certain embodiments, the delignification step comprises treating the lignocellulosic material with hydrogen peroxide under alkaline or acidic conditions.

In certain embodiments, the delignification step comprises treating the lignocellulosic material with at least one oxidizing agent under acidic conditions.

In certain embodiments, the delignification step comprises treating the lignocellulosic material with hydrogen peroxide, sodium chlorite, sodium sulfite or ozone under acidic conditions.

In certain embodiments, the delignification step comprises treating the lignocellulosic material with hydrogen peroxide under acidic conditions. In certain embodiments, the delignification step comprises treating the lignocellulosic material with acetic acid in combination with $H_2O_2$.

The use of acetic acid in combination with $H_2O_2$ is a less poisonous treatment, compared to other delignification treatments.

In certain embodiments, the delignification step comprises treating the lignocellulosic material with at least one base. The pH is adjusted between 8 and 14, in this case 14.

In certain embodiments, the delignification step comprises treating the lignocellulosic material with sodium hydroxide.

To obtain an evenly delignification, the delignification solution has to infiltrate the lignocellulosic material completely.

In certain embodiments, the delignification step comprises an incubation of the infiltrated lignocellulosic material at a temperature between 20° C. and 90° C.

In certain embodiments, the delignification step comprises an incubation of the infiltrated lignocellulosic material at a temperature between 60° C. and 90° C.

In certain embodiments, the delignification step comprises an incubation of the infiltrated lignocellulosic material at a temperature between 75° C. and 85° C.

In certain embodiments, the delignification step comprises an incubation of the infiltrated lignocellulosic material at 80° C.

In certain embodiments, the densification is performed stepwise.

In certain embodiments, the densification is performed by applying a compression force in intervals until a predefined or the maximum degree of densification of the delignified material is obtained. For example, the delignified material has a height of 10 mm and a height of 3 mm is targeted. The compression is performed stepwise by seven cycles of 1 mm compression followed by 15 sec waiting time in which the compression force is not further increased. The compression force required for a reduction from a height of 10 mm to 9 mm may be less than the compression force required for the height reduction from 4 mm to 3 mm of the same material. This can be explained by the stronger resistance to compression of the 4 mm thick partially densified material compared to the 10 mm thick material without densification.

Depending on the material and degree of compression already obtained, varying compression forces may be applied.

Particularly, compression forces up to 20 kN are applied.

The maximum densification is reached if the volume (lumina) of the cellulosic fibres is minimized and the contact surface between the cellulosic fibres is maximized and the pores in the delignified cell walls are compacted.

In certain embodiments, the densification is performed in repetitions of 1 mm compression, 15 sec waiting time.

The material can have different sizes, shapes and geometries without cutting fibres. The material may be post-processed such as bending of the elements.

In certain embodiments, the densification is performed with additional lateral vibration.

In certain embodiments, the densification is performed with lateral vibration characterized by a frequency between 1 and 1000 Hz. The vibration width for a 2 cm wide sample ranges from 0.02 mm to 5 mm.

The densification is performed applying a vertical compression force and an additional lateral vibration that causes a lateral shear force. This vibration causes an entanglement of the cellulose fibrils and fibers. The entanglement is only possible if the lignin is sufficiently removed between the fibrils. The lateral vibration causes a more compact stacking of the cellulose fibers (FIG. 7).

In certain embodiments, the densification is performed in radial or tangential direction.

In certain embodiments, the densification is performed in radial direction.

In certain embodiments, at least two units of the delignified material are combined in a way that the fibers of the units are in parallel orientation or in various orientations to each other before the densification step is applied.

If several delignified units are combined in such a way that the cellulose fibers of all units are aligned in one orientation, a densified material that is comparable to laminated timber will be obtained upon densification.

If several delignified units are combined in alternating layers in such a way that the cellulose fibers of one layer are aligned in one orientation and the cellulose fibers of the other layer are aligned in one orientation rotated, in particular by 90°, densified material with a layer orientation like in plywood will be obtained upon densification.

Several delignified units may be combined in such a way that the cellulose fibers of the units are in various orientation to each other. A combination of several delignifed units can also be used to increase the dimensions of the densified material by an assembly of smaller units of delignified material.

In certain embodiments, the lignocellulosic material is wooden material.

In certain embodiments, the lignocellulosic material is softwood or hardwood.

In certain embodiments, at least one resin, thermoset or thermoplastic is added after step b and before step c. The resin, thermoset or thermoplastic fills the spaces between the cellulose fibres and the cellulose fibrils that result from the lignin removal. Thus, an almost complete lignin removal has the advantage of creating large and many pores allowing the uptake of resins, thermosets or thermoplastics, as shown for instance by Yana et al (Yano et al, 2001, J. Mater. Sci Letters 20: 1125-1126) fora partial lignin removal.

In certain embodiments, at least one epoxide or thermoplastic suspension is added after step b and before step c.

In certain embodiments, an additional modification step is performed before and/or after step b.

In certain embodiments, polymerization, mineralization, metallization or a combination thereof, is performed before and/or after step b.

According to the second aspect of the invention, a delignified material, in particular obtained by the method according to the first aspect of the invention, is provided. The delignified material is characterized by cellulose fibers and microfibrils that are maintained in the structural directionality of the lignocellulosic material and that the lignin of the lignocellulosic material is almost completely removed.

According to a third aspect of the invention, a densified material, in particular obtained by the method according to the first and second aspects of the invention, is provided. The densified material is characterized by cellulose fibers that are maintained in the structural directionality of the lignocellulosic material, and the lignin of said lignocellulosic material is almost completely removed and the density of the densified material is decreased compared to the delignified material, in particular the densitiy of the densified material ranges from 400 to 1200 kg/m$^3$, in particular 750 to 1150 kg/m$^3$.

An almost complete removal of lignin is characterized by the loss of the characteristic color of the lignocellulosic material, in particular the characteristic color of wood.

As stated above, lignin contributes to the characteristic color of wood. Upon removal of lignin, the cellulose material appears colorless to white.

The delignifed and densified material according to the invention is more homogenous than wood and shows a better mechanical performance. The material can more easily be functionalized/modified compared to wood.

In certain embodiments, the density of the densified material ranges from 400 to 1200 kg/m$^3$.

In certain embodiments, the density of the densified material ranges from 750 to 1150 kg/m$^3$.

In certain embodiments, the elastic modulus of the densified material ranges from 20 to 60 GPa.

In certain embodiments, the elastic modulus of the densified material ranges from 40 to 50 GPa.

In certain embodiments, the elastic modulus of the densified material is 45 GPa.

In certain embodiments, the tensile strength of the densified material ranges from 100 to 300 N/mm$^2$.

In certain embodiments, the tensile strength of the densified material ranges from 225 to 275 N/mm$^2$.

In certain embodiments, the tensile strength of the densified material is 250 N/mm$^2$.

EXAMPLES

In the following, the general process for producing cellulose composite material including alternative or additional steps is described.

Material

Softwood or hardwood blocks with the dimensions 100×10×20 mm$^3$ (longitudinal×radial×tangential).

Delignification

Delignification of wood samples can be achieved with a combination of acidic or alkaline and oxidation treatments in particular using hydrogen peroxide and acetic acid until a white color of the samples is obtained.

Unmodified samples had on average a density of 438 kg/m$^3$, while samples after delignification treatments had an average density of 289 kg/m$^3$, which is only 66% of the density of native unmodified material (34% less), which is due to a mass loss and not because of a volume increase. A reasonable figure for the lignin content of spruce is around 28%. Although one has to consider a partial removal of hemicelluloses and amorphous cellulose, one can conclude from these figures and the white color of the samples, that almost all lignin was removed by the treatment.

For further processing, the delignified wood can be kept at wet or at different relative humidity levels such as 65% or 95%, run through a solvent exchange cycle (e.g. ethanol, methanol) and/or be combined with a resin to obtain a compact fibre composite in the densification step.

Densification

Figure 1:
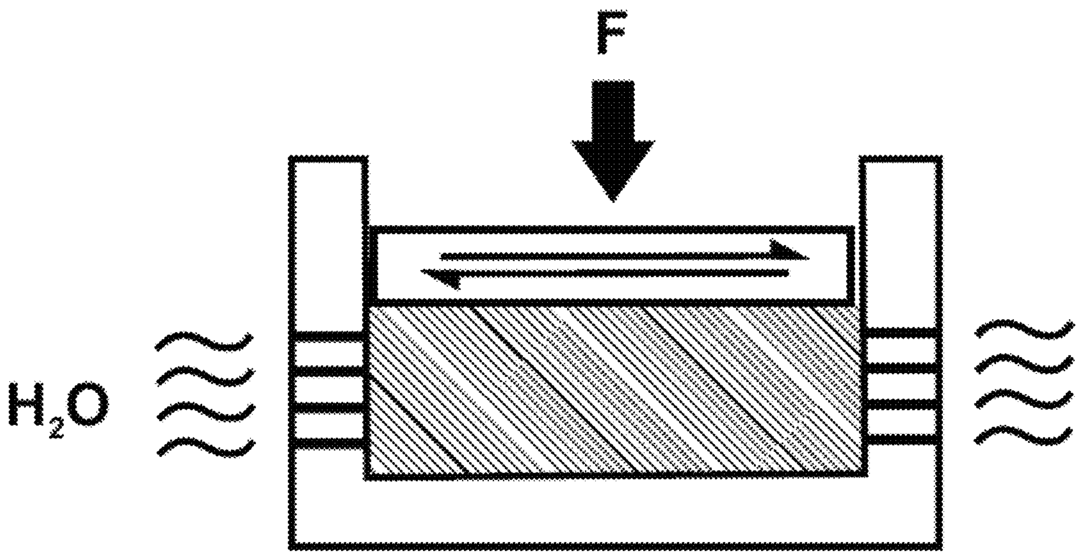
FIG. 1 shows a schematic drawing of the densification protocol with a compressive force (F) and lateral shear (arrows). A delignified block (grey dotted area) is placed in a chamber that allows the efflux of water during densification. The delignified block is densified in lateral direction.

The block of delignified material is densified in an apparatus, which restricts a lateral expansion. The densification is achieved by loading the sample from the top and a lateral shear movement (see FIG. 1, schematic drawing of the setup).

Depending on the sample treatment and the targeted sample dimensions it is possible to merge several smaller delignified blocks or sheets to one larger sample.

After the targeted state of densification is reached, the sample is allowed to dry, while the compressive force may be adjusted to still load the sample during shrinking of the sample.

For the densification, the following parameters may be chosen: The delignified wood sample is placed in a press mold which determines the final dimensions of the product. A fitting piston is used for the densification of the deliginfied wood sample. An additional lateral vibration is applied to build up a simultaneous shear force which allows for creating a tighter interaction between the cellulose fibres.

Amplitude and frequency of the vibrational movement need to be adapted to the geometry of the sample. The vibrational densification takes place stepwise. After the first contact of the piston with the sample, a predefined distance for densification is covered by the piston. This is followed by a phase in which this distance is kept for a determined time period. This procedure is repeated until the specified sample thickness is reached. Finally the sample is allowed to dry, while the applied forces are kept (the piston follows the reduction of sample thickness, due to the shrinkage during drying).

Example 1: High-Density Densification of Wood Pieces in the Wet State

Material

Spruce wood blocks with the dimensions 100×10×20 $mm^3$ (longitudinal×radial×tangential).

Delignification

Hydrogen peroxide ($H_2O_2$, 30% analytical grade, Merck) and acetic acid (99.8%, Sigma Aldrich) were mixed directly prior to the delignification at a volumetric ratio of 1:1. Wood bars were placed standing in a beaker and incubated in the acidic solution for 3 days and subsequently heated to 80° C. The delignification bath was kept at temperature for 12 h under stirring at 150 rpm before the wood was removed and intensively washed with deionized water. The washing procedure was continued for 5 days with 2 exchanges of the water per day before the subsequent densifying treatment.

Densification

The block of wet delignified material was densified in an apparatus, which restricts a lateral expansion. The densification is achieved by loading the sample from the top and a lateral shear movement (see FIG. 1, schematic drawing of the setup).

The delignified wood sample is placed in a press mold which determines the final dimensions of the product. A fitting piston is used for the densification of the deliginfied wood sample of up to 20 kN. An additional lateral vibration is applied to build up a simultaneous shear force which allows for creating a tighter interaction between the cellulose fibres. Amplitude and frequency of the vibrational movement need to be adapted to the geometry of the sample. The vibrational densification takes place stepwise. After the first contact of the piston with the sample, a predefined distance for densification is covered by the piston. This is followed by a phase in which this distance is kept for a determined time period. This procedure is repeated until the specified sample thickness is reached. Finally the sample is allowed to dry, while the applied forces are kept (the piston follows the reduction of sample thickness, due to the shrinkage during drying).

Tests on resin free sample revealed densities around 1150 $kg/m^3$ and mechanical properties as follows:

- Sample 1: elastic modulus 47.0 GPa and a tensile strength of 250 $N/mm^2$;
- Sample 2: elastic modulus 30.1 GPa and a tensile strength of 175 $N/mm^2$;
- Sample 3: elastic modulus 31.6 GPa and a tensile strength of 111 $N/mm^2$.

Figure 2:
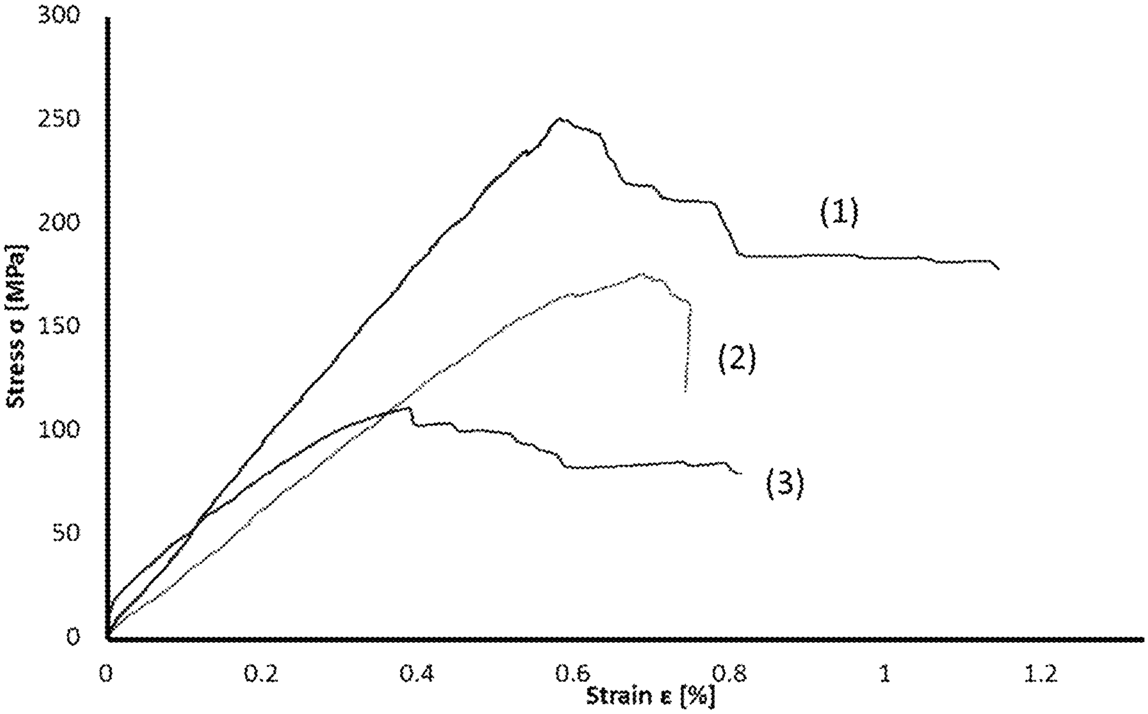
FIG. 2 shows stress strain curves of three delignified samples produced as described in Example 1
Figure 3:
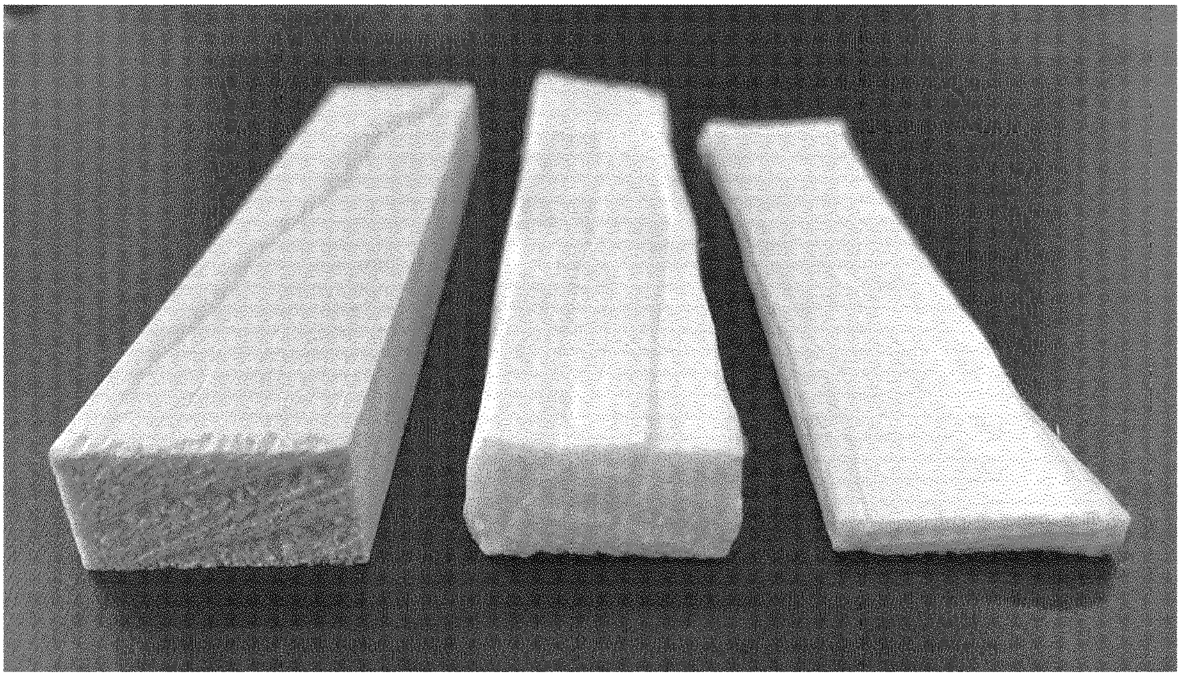
FIG. 3 shows a wood sample before treatment (left), a delignified sample (middle) and a delignified and densified sample (right). Samples were prepared as described in Example 2. The structural directionality of the cellulose fibers is maintained.
Figure 4A:
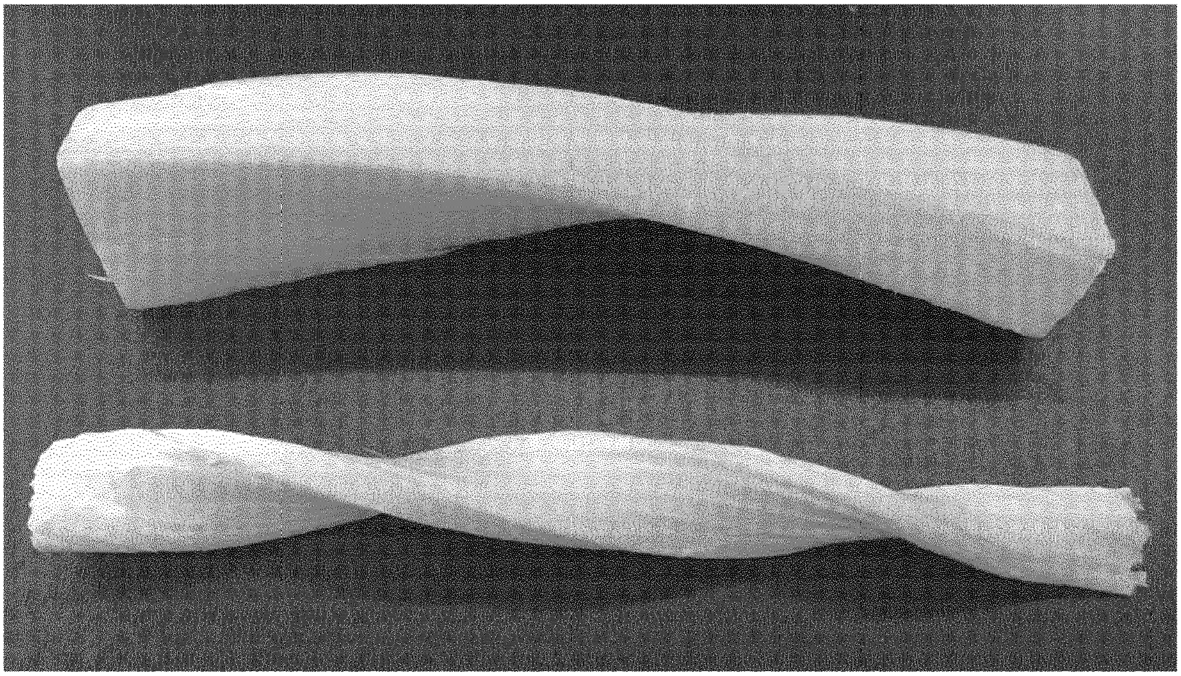
FIG. 4 shows twisted (a) and bent (b) samples. The upper samples shown in (a) and the samples shown in (b) are not densified. The lower sample shown in (a) has been densified. The fiber structure of the twisted and bent samples is maintained in all samples. Samples were treated as described in Example 2.
Figure 4B:
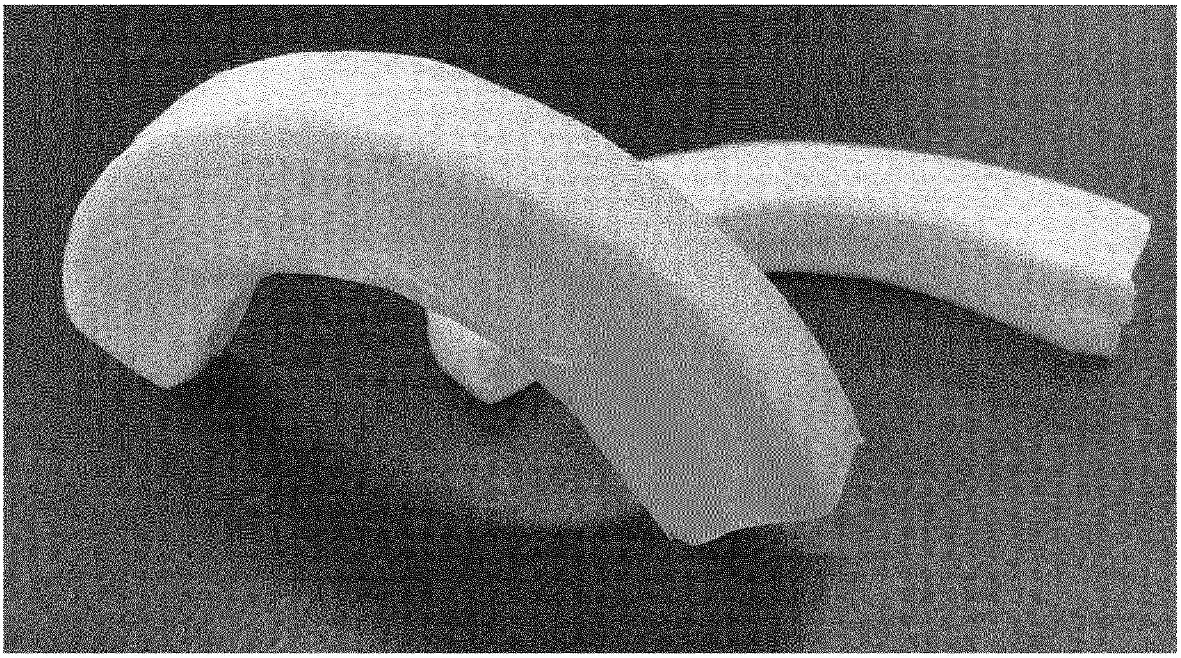
Figure 5:
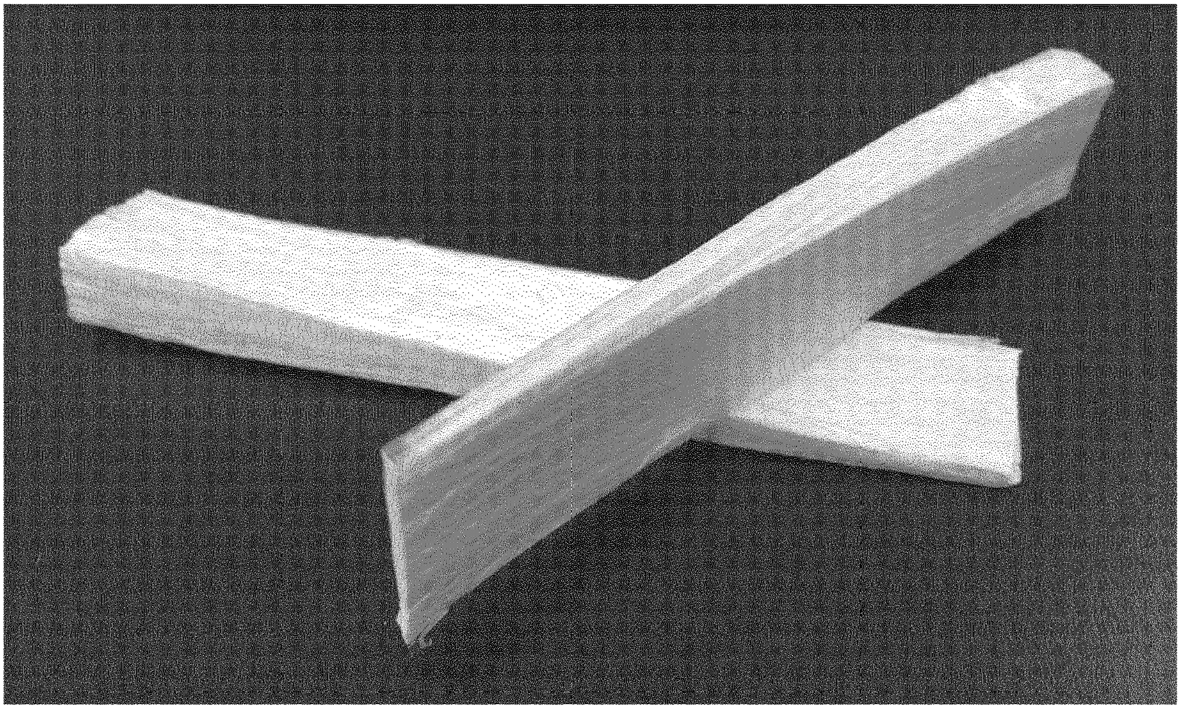
FIG. 5 shows delignified samples that have been gradually densified. Samples were treated as described in Example 2. The density decreases gradually from the thin to the thick end of the blocks, by applying different pressure along the block.

FIG. 2 shows stress-strain curves of the samples.

Example 2: Moderate-Density Densification of Lignification of Wood Pieces in Dry State (65% Relative Humidity)

Wood Samples

Wood pieces of Norway spruce (*Picea abies*) with the dimensions 100×10×20 $mm^3$ (longitudinal×radial×tangential) were used. The pieces were stored at 20° C., 65% rel. humidity before treatment.

Delignification

Hydrogen peroxide ($H_2O_2$, 30% analytical grade, Merck) and acetic acid (99.8%, Sigma Aldrich) were mixed directly prior to the delignification at a volumetric ratio of 1:1. Wood bars were placed standing in a beaker and incubated in the acidic solution for 3 days and subsequently heated to 80° C. Wood pieces were infiltrated over night at RT under stirring at 150 rpm. The solution was then heated to 80° C. and the pieces were delignified for 6 h. The infiltration (over night) and delignification (6 h) steps were repeated once with a fresh peroxide-HAc solution. After delignification the samples were washed in water for 24 h. The washing solution was exchanged five times. After washing, samples were stored in climate cabinets until a constant mass was obtained. 3 different humidity conditions were used for densification: 20° C./65%, 20° C./95% and wet samples.

Densification of Delignified Wood Pieces

For densification the Zwick Roell 100 kN machine was used in compression mode. Delignified wood pieces were densified in radial direction in a mold (100×20 $mm^2$). The punch was pressed into the mold stepwise and position-controlled (1 mm compression, 15 s waiting time). The delignified wood pieces were compressed from an initial thickness of 10 mm down to 3 mm.

Shearing of the cellulose structure was obtained by applying a lateral vibrational movement to the punch during compression. The vibrational movement was induced by an air compressor gun (2 bar) connected to the punch.

After densification, the densified pieces were conditioned at 20° C./65%. While conditioning, the pieces were pressed with weights (15 kPa) to keep a pressure while shrinking of the samples.

In this example cellulose blocks were less strongly densified to reach a density around 750 $kg/m^3$ Tensile Testing Tensile properties of delignified and densified wood pieces were tested with the Zwick Roell 10 kN machine. The tested length was 25 mm. Strain was measured with a video extensiometer.

Figure 6:
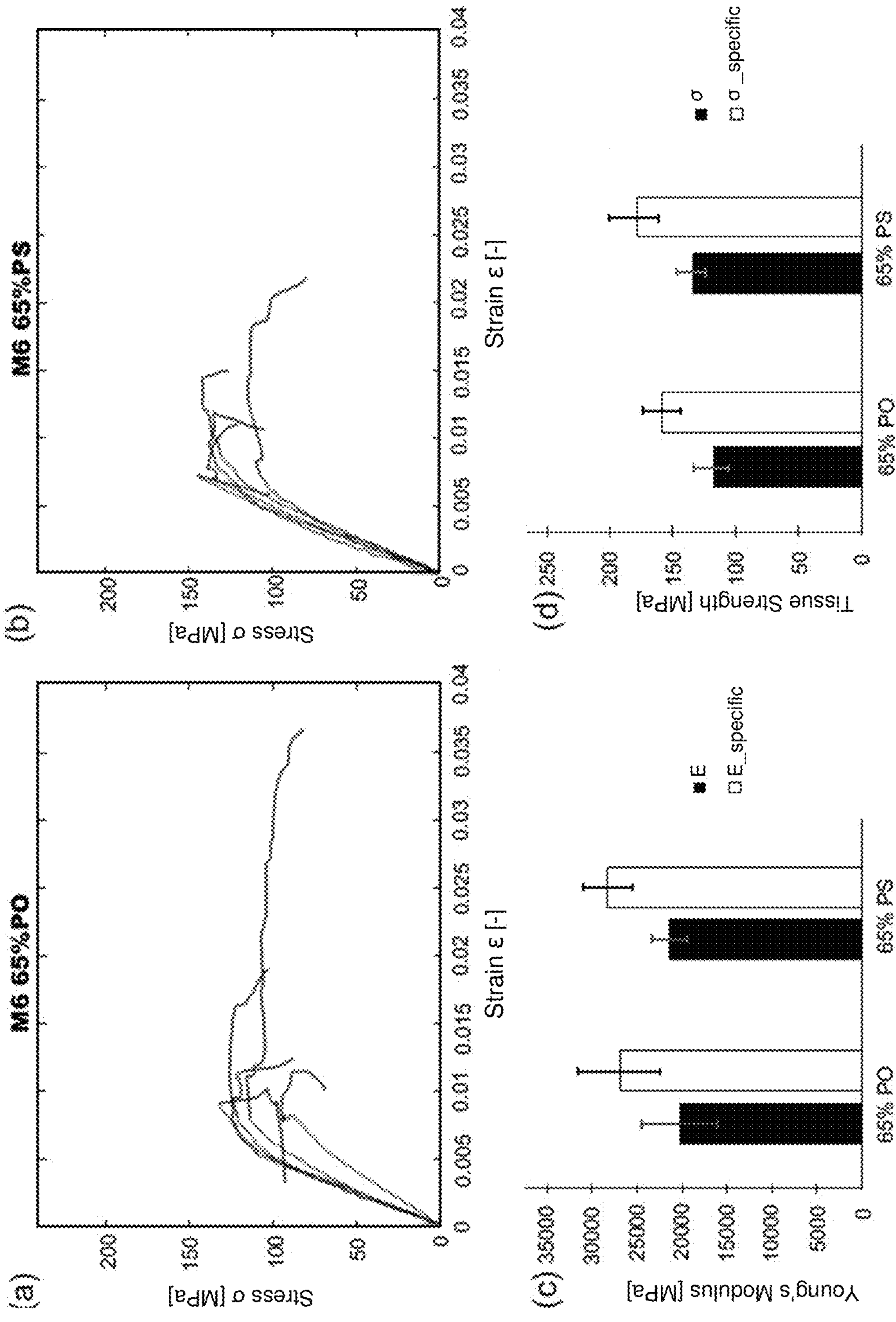
FIG. 6: Comparison of tensile properties of cellulose samples equilibrated at 65% relative humidity (RH), densified with or without additional shear; (a) stress strain curves of samples densified without shear loading (PO); (b) stress strain curves of samples densified with shear loading (PS); (c) Average elastic moduli (E) and specific elastic moduli (E_specific) for PO and PS samples +SD; (d) Average tensile strength (σ) and specific tensile strength (σ_specific) for PO and PS samples +SD. Samples were prepared as described in Example 2.
Figure 7:
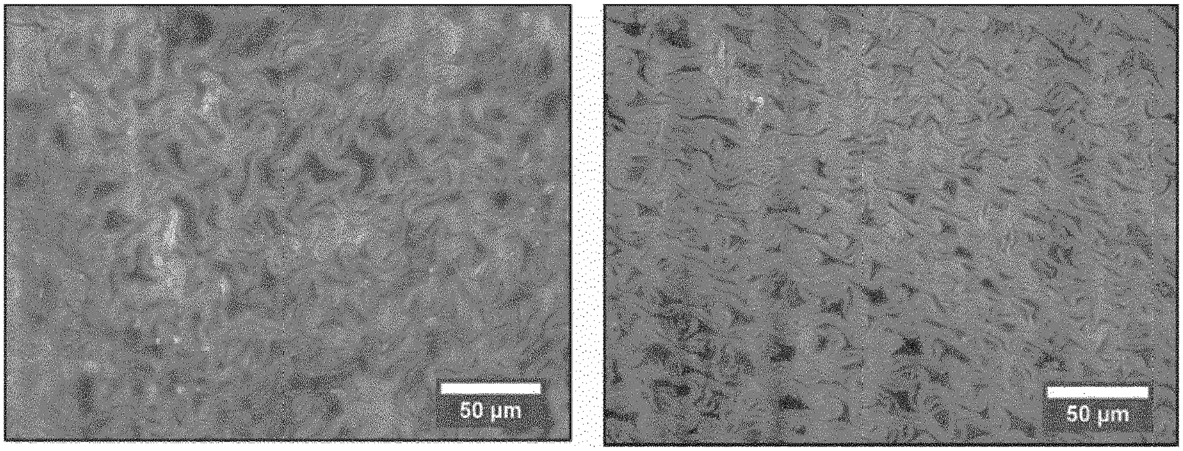
FIG. 7 shows earlywood regions after densification without lateral shear forces (left image) and with lateral shear forces (right image). The densification with lateral shear forces results in a more compact packaging of the cellulose fibers compared to densification without lateral shear forces.

A comparison of mechanical properties of densified samples treated without additional shear and with additional shear indicate an increase in tensile strength due to shearing (FIG. 6), which might be further pronounced for higher shear loads and more strongly densified samples. The potential effect of the lateral shearing became also visible in light microscopy studies on the densified earlywood regions A comparison of densified samples treated without additional shear (FIG. 7, left image) and with additional shear (FIG. 7, right image) makes obvious, that the shearing can result in a beneficial stacking of the cellulose fibres. Higher shear forces may also lead to a fibrillation of the fibre's cell walls and an interlocking of cellulose microfibrils, which together with the stacking of fibers at a higher hierarchical level could further enhance the entanglement and lead to superior properties of the cellulose composites.

The invention claimed is:

1. A method for obtaining densified material comprising the steps of a. providing lignocellulosic material, wherein the lignocellulosic material is wood, b. delignification of said lignocellulosic material providing a delignified wood material, wherein the delignification step comprises treating the lignocellulosic material with hydrogen peroxide and acetic acid, wherein the delignification step is performed in such a way that the lignin of said lignocellulosic material is almost completely removed and until the characteristic color of the lignocellulosic material is lost, and wherein the structural integrity of said lignocellulosic material is maintained in said delignified material, c. compressing the delignified material thereby producing a densified wood material, wherein the densified material is characterized in that the density of the densified material is 400 to 1200 kg/$m^3$.

2. The method according to claim 1, wherein the delignification step comprises an incubation of the infiltrated lignocellulosic material at a temperature between 20° C. and 90° C.

3. The method according to claim 1, wherein the densification is performed stepwise.

4. The method according to claim 1, wherein the densification is performed with additional lateral vibration.

5. The method according to claim 1, wherein the densification is performed in radial or tangential direction.

6. The method according to claim 1, wherein at least two units of said delignified material are combined in a way that the fibers of said units are in parallel orientation or in various orientations to each other before the densification step is applied.

7. The method according to claim 1, wherein the lignocellulosic material is softwood or hardwood.

8. The method according to claim 1, wherein at least one resin, thermoset or thermoplastic, is added after step b and before step c.

9. The method according to claim 1, wherein an additional modification step, is performed before and/or after step b.

10. The method according to claim 1, wherein the delignification step comprises treating the lignocellulosic material with hydrogen peroxide and acetic acid provided at a volumetric ratio of 1:1.

11. The method according to claim 1, wherein the delignification step comprises an incubation of the infiltrated lignocellulosic material at a temperature between 60° C. to 90° C.

12. The method according to claim 1, wherein the delignification step comprises an incubation of the infiltrated lignocellulosic material at a temperature between 75° C. to 85° C.

13. The method according to claim 1, wherein the densification is performed by applying a compression force in intervals until a predefined or the maximum degree of densification of the delignified material is obtained.

14. The method according to claim 1, wherein the densification is performed with lateral vibration characterized by a frequency between 1 Hz and 1000 Hz.

15. The method according to claim 1, wherein the densification is performed in radial direction.

16. The method according to claim 1, wherein at least one of epoxide or thermoplastic suspension, is added after step b and before step c.

17. The method according to claim 1, wherein a polymerization, mineralization, metallization or a combination thereof, is performed before and/or after step b.

* * * * *